(12) United States Patent
Tseng et al.

(10) Patent No.: US 9,740,315 B2
(45) Date of Patent: Aug. 22, 2017

(54) TOUCH PANEL AND METHOD OF MANUFACTURING THE SAME

(71) Applicant: TPK Glass Solutions (Xiamen) Inc., Xiamen (CN)

(72) Inventors: Chan-Hao Tseng, Tainan (TW); Sheng-Pin Su, Zhongli (TW); Cheng-Hao Huang, Changhua (TW); Yung-Pei Chen, Taichung (TW); Zhirong Yang, Zhangzhou (CN)

( * ) Notice: Subject to any disclaimer, the term of this patent is extended or adjusted under 35 U.S.C. 154(b) by 19 days.

(21) Appl. No.: 14/525,157

(22) Filed: Oct. 27, 2014

(65) Prior Publication Data
US 2015/0116245 A1    Apr. 30, 2015

(30) Foreign Application Priority Data
Oct. 26, 2013  (CN) .......................... 2013 1 0521045

(51) Int. Cl.
*G06F 3/041*      (2006.01)
*G06F 3/047*      (2006.01)

(52) U.S. Cl.
CPC .............. *G06F 3/041* (2013.01); *G06F 3/047* (2013.01); *G06F 2203/041* (2013.01); *G06F 2203/04103* (2013.01); *G06F 2203/04107* (2013.01); *Y10T 29/49124* (2015.01)

(58) Field of Classification Search
CPC ........... G06F 2203/04103; G06F 3/041; G06F 2203/041; G06F 2203/04107; G06F 3/047; Y10T 29/49124
USPC ............................................ 349/12; 345/204
See application file for complete search history.

(56) References Cited

U.S. PATENT DOCUMENTS

| | | | |
|---|---|---|---|
| 2006/0267969 A1* | 11/2006 | Doi .................... | G02F 1/133512 345/204 |
| 2013/0168220 A1* | 7/2013 | Ho ................................ | 200/600 |
| 2014/0124341 A1* | 5/2014 | Park ............................. | 200/293 |
| 2014/0204286 A1* | 7/2014 | Park et al. ...................... | 349/12 |

* cited by examiner

*Primary Examiner* — Tony Davis (57) ABSTRACT

The present disclosure provides a touch panel, including: a substrate having a visible region and a non-visible region adjacent to at least one side of the visible region; a composite layer disposed over the non-visible region, wherein the composite layer includes a color layer and a light-shielding layer, and the color layer is disposed between the substrate and the light-shielding layer, wherein a side of the color layer adjacent to the visible region has a first inclined surface, and a side of the light-shielding layer adjacent to the visible region has a second inclined surface, wherein the first inclined surface and the second inclined surface are form a continuous surface; a sensing layer disposed over the visible region and extending to a portion of the non-visible region, wherein the sensing layer directly contacts the visible region of the substrate; and a signal wire disposed over the composite layer.

15 Claims, 10 Drawing Sheets

TOUCH PANEL AND METHOD OF MANUFACTURING THE SAME

BACKGROUND OF THE INVENTION

This application claims priority of China Patent Application No. 201310521045.9, filed on Oct. 26, 2013, the entirety of which is incorporated by reference herein.

TECHNICAL FIELD

The disclosure relates to a touch panel and a method of manufacturing the same, and in particular to a method of manufacturing a touch panel by cutting, laminating and baking processes and a touch panel manufactured thereby.

DESCRIPTION OF THE RELATED ART

In recent years, touchscreens have gradually become the main input manner, and they have found wide application in various electronic products such as cell phones, personal digital assistants (PDA), or pocket personal computers. These touch devices usually utilize touch panels having a substrate and elements formed on the substrate, such as sensing electrodes, black light-shielding layers and touch signal wiring. The substrate can protect and support the internal elements, and the substrate can be divided into a visible region and a non-visible region surrounding the visible region. The sensing electrode is disposed over the visible region of the substrate, while the touch signal wiring is disposed over the non-visible region of the substrate to electrically connect the sensing electrode and the external circuit such as a flexible print circuit board. Since the touch signal wiring is usually made of metal materials, a black light-shielding layer is formed over the touch signal wiring in the non-visible region to shield the touch signal wiring.

However, when the thickness of the black light-shielding layer is thick (such as 10 μm), it is hard to form the subsequent elements on the sidewall of the black light-shielding layer. For example, when forming the subsequent sensing electrode, it is difficult to form the sensing electrode on the thick sidewall of the black light-shielding layer at the interface of the visible region and the non-visible region, which results in a broken-wire issue. To address this issue, segmental printing is conventionally used to form a slant sidewall of the black light-shielding layer. However, the segmental printing needs multiple manufacturing steps and is not cost-effective. Besides, the multiple manufacturing steps will lower the yield and the throughput. Therefore, a method for fabricating touch panels with low-costs, high yield, and high throughput, which can solve the broken-wire problem, is needed.

SUMMARY OF THE INVENTION

The present disclosure provides a touch panel, including: a substrate having a visible region and a non-visible region adjacent to at least one side of the visible region; a composite layer disposed over the non-visible region, wherein the composite layer includes a color layer and a light-shielding layer, and the color layer is disposed between the substrate and the light-shielding layer, wherein a side of the color layer adjacent to the visible region has a first inclined surface, and a side of the light-shielding layer adjacent to the visible region has a second inclined surface, wherein the first inclined surface and the second inclined surface are a continuous surface; a sensing layer disposed over the visible region and extending to a portion of the non-visible region, wherein the sensing layer directly contacts the visible region of the substrate; and a signal wire disposed over the composite layer.

The present disclosure also provides a method for manufacturing a touch panel, including: providing a substrate having a visible region and a non-visible region adjacent to at least one side of the visible region; providing a stack structure, including: a bottom protective layer; a color layer disposed over the bottom protective layer; a light-shielding layer disposed over the color layer; and a top protective layer disposed over the light-shielding layer; cutting the stack structure into a predetermined shape, wherein the predetermined shape of the cut stack structure corresponds to a shape of the non-visible region, and an acute angle between at least one side of the cut stack structure and a surface of the bottom protective layer of the stack structure is a first angle; removing the bottom protective layer of the cut stack structure; after removing the bottom protective layer, laminating the stack structure onto the non-visible region of the substrate, wherein the color layer faces toward the substrate; removing the top protective layer, the color layer and the light-shielding layer remain to form a composite layer disposed over the substrate; performing a baking process to deform the composite layer, wherein an acute angle between the baked composite layer and a main surface of the substrate is a second angle, wherein the second angle is smaller than the first angle; forming a sensing layer disposed over the visible region and extending to a portion of the non-visible region, wherein the sensing layer directly contacts the visible region of the substrate; and forming a signal wire disposed over the composite layer.

According to the aforementioned, the present disclosure utilize a cutting step, a laminating step and a baking step to replace the conventional segmental printing which needs multiple manufacturing steps. The present disclosure can reduce the complexity of manufacture and lower the cost. In the meantime, the present disclosure can increase the yield and the throughput due to the reduction of the manufacturing steps needed. The baking step can further reduce the slope of the joint surface of the sensing layer, light-shielding layer and the color layer such that the sensing layer has a more robust structure and would not be broken easily at the sidewall.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION OF THE DISCLOSURES

In the following detailed description, for purposes of explanation, numerous specific details are set forth in order to provide a thorough understanding of the disclosed embodiments. It will be apparent, however, that one or more embodiments can be practiced without these specific details. In other instances, well-known structures and devices are schematically shown in order to simplify the drawing.

In this specification, expressions such as "overlying the substrate", "above the layer", or "on the film" simply denote a relative positional relationship with respect to the surface of a base layer, regardless of the existence of intermediate layers. Accordingly, these expressions can indicate not only the direct contact of layers, but also, a non-contact state of one or more laminated layers. It is noted that in the accompanying drawings, like and/or corresponding elements are denoted to by like reference numerals.

The terms "about" and "substantially" typically means +/−20% of the stated value, more typically +/−10% of the stated value and even more typically +/−5% of the stated value. The stated value of the present disclosure is an approximate value. When there is no specific description, the stated value includes the meaning of "about" or "substantially".

The method for manufacturing a touch panel of present disclosure utilizes a cutting step, a laminating step and a baking step to replace the conventional segmental printing which needs multiple manufacturing steps to reduce the complexity of manufacture and lower the cost and increase the yield and the throughput.

Figure 1:
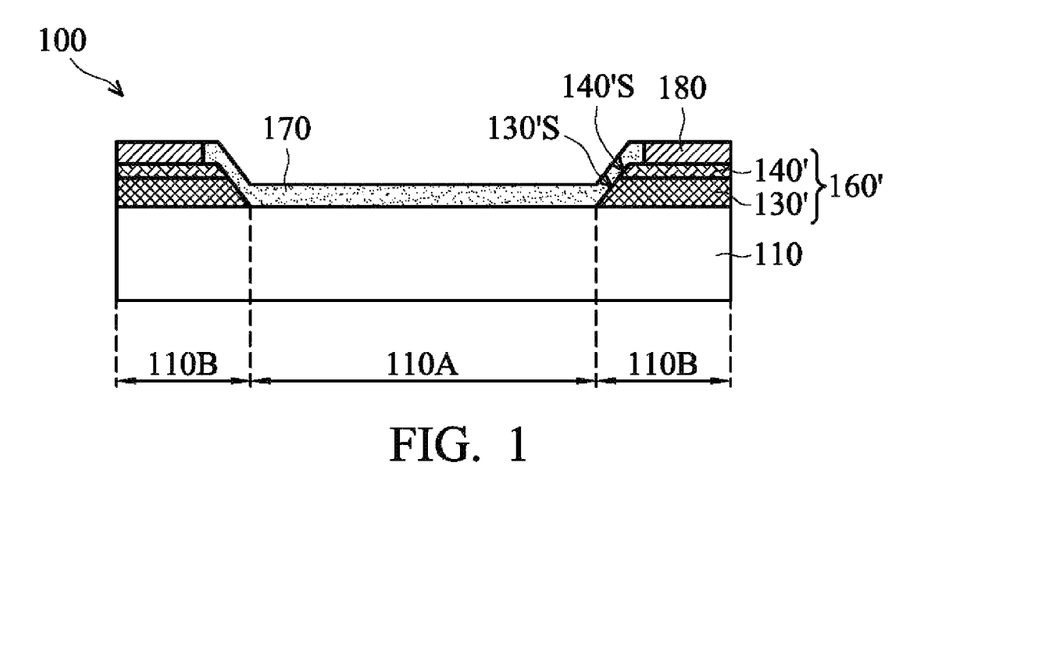
FIG. 1 is a cross-sectional view of a touch panel in accordance with some embodiments of the present disclosure.
Figure 2:
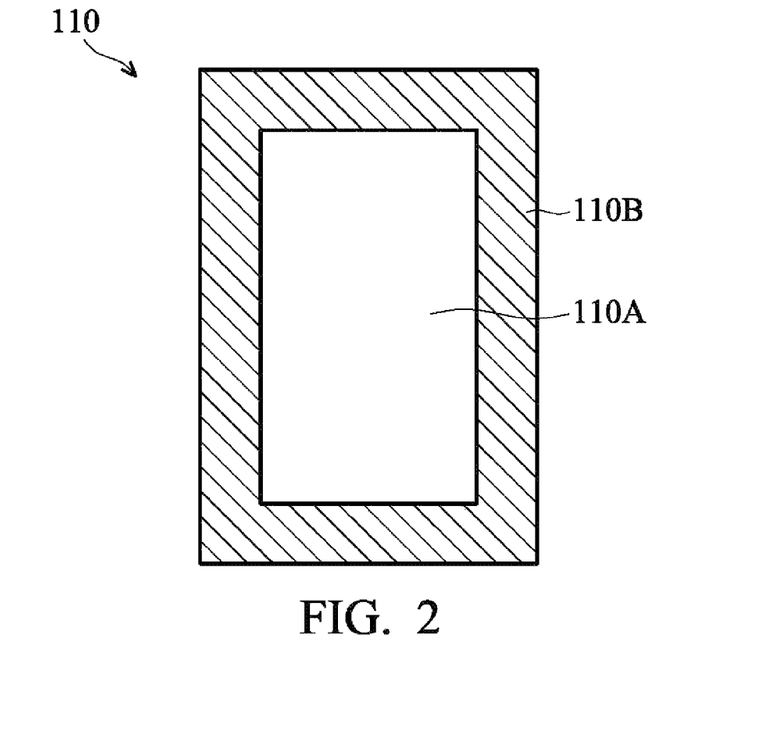
FIG. 2 is a top view of a substrate in accordance with some embodiments of the present disclosure.

FIG. 1 is a cross-sectional view of a touch panel in accordance with some embodiments of the present disclosure. As shown in the figure, the touch panel 100 includes a substrate 110 having a visible region 110A and a non-visible region 110B surrounding the visible region 110A. The composite layer 160' is disposed over the non-visible region of the substrate 110B. The composite layer 160' includes a color layer 130' and a light-shielding layer 140. The color layer 130' is disposed between the substrate 110 and the light-shielding layer 140'. The side of the color layer 130' adjacent to the visible region 110A has a first inclined surface 130'S, and the side of the light-shielding layer 140' adjacent to the visible region 110A has a second inclined surface 140'S. The first inclined surface 130'S and the second inclined surface 140'S are formed a continuous surface. In other words, the first inclined surface 130'S and the second inclined surface 140'S are conjunctive and both extend toward the same direction. In one embodiment, the slope of the first inclined surface 130'S is the same as the second inclined surface 140'S. The sensing layer 170 is disposed over the visible region 110A and extends to a portion of the non-visible region 110B. The sensing layer 170 directly contacts the visible region 110A of the substrate 110. The signal wire 180 is disposed over the composite layer 160'. The method for manufacturing the touch panel 100 will be described in the following.

Figure 11:
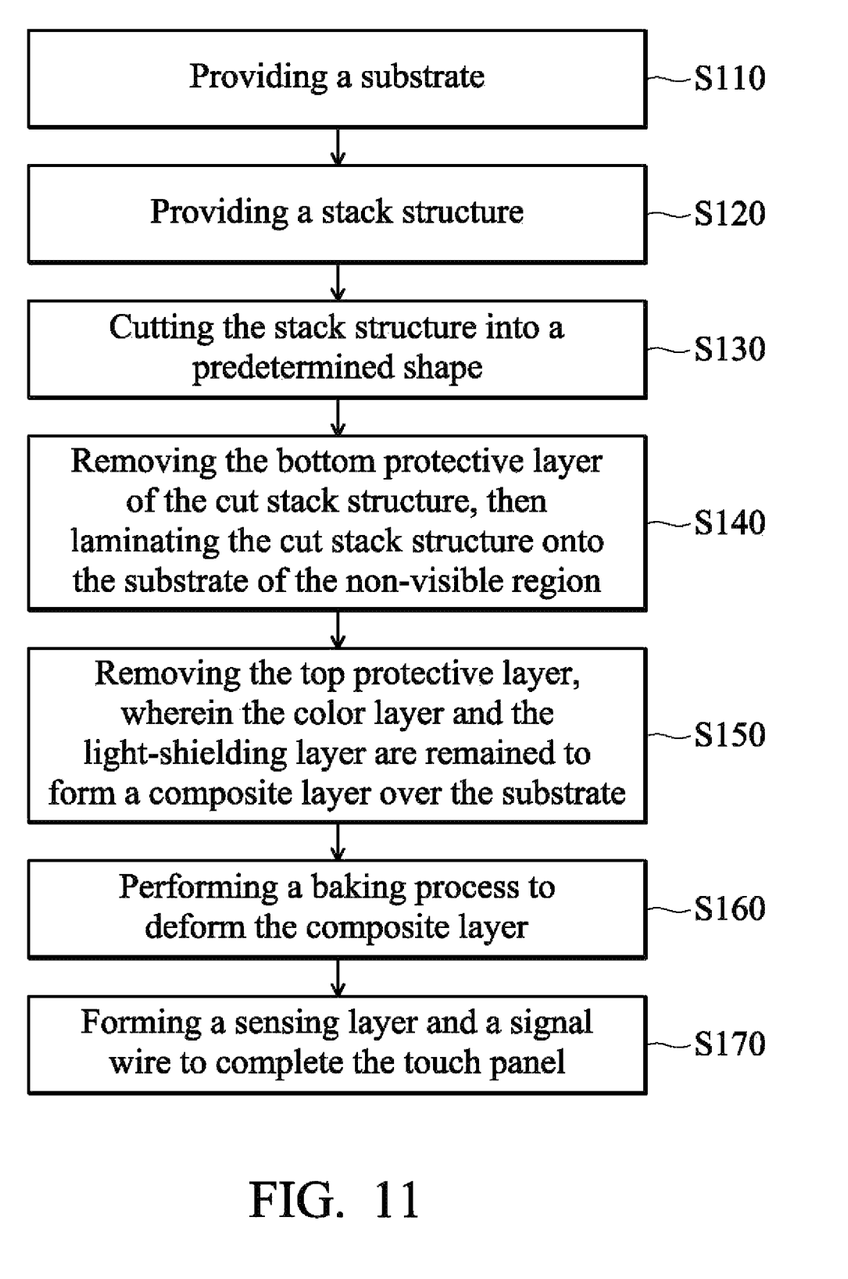
FIG. 11 is a flow chart for manufacturing a touch panel in accordance with some embodiments of the present disclosure.

FIGS. 1-9 are schematic views of the touch panel 100 at various fabrication stages in accordance with some embodiments. FIG. 11 is a flow chart for manufacturing a touch panel in accordance with some embodiments of the present disclosure. First, referring to FIG. 2 and step S110 of FIG. 11, a substrate 110 is provided. The central region of the substrate 110 can serve as the predetermined visible region 110A, and the region surrounding the central region can serve as the predetermined non-visible region 110B. Namely, the non-visible region 110B is disposed around the visible region 110A. Note that in other configurations, the non-visible region 110B can be disposed at one side, two sides, three sides or four sides of the visible region 110A. These configurations will be described in FIG. 10(a)-10(d). The substrate 110 can be a transparent tempered glass substrate, a plastic substrate or any other suitable substrates. The substrate 110 can serve as, but is not limited to, the cover lens of the touch panel 100.

Figure 3:
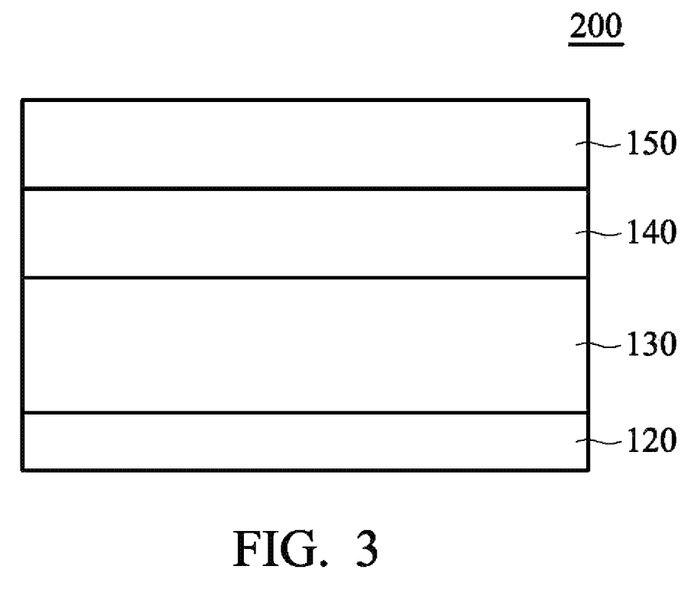
FIG. 3 is a cross-sectional view of a stack structure in accordance with some embodiments of the present disclosure.

Next, referring to FIG. 3 and step S120 of FIG. 11, a stack structure 200 is provided. The stack structure 200 includes sequentially a bottom protective layer 120, a color layer 130, a light-shielding layer 140 and a top protective layer 150. The top protective layer 150 not only provides a protection, but also provides a support for the light-shielding layer 140, the color layer 130 and the bottom protective layer 120. The color of the material of the color layer 130 includes black, white or colored printing ink, therefore the color layer 130 can be black, white or colored. The thickness of the color layer 130 can range from about 1 μm to 60 μm, preferably from about 2 μm to 40 μm. The color layer 130 is used to decorate the non-visible region 110B of the substrate 110. The material of the light-shielding layer 140 includes black photoresist or black printing ink, therefore the light-shielding layer 140 can be black. The thickness of the light-shielding layer 140 can range from about 1 μm to 10 μm, preferably from about 1 μm to 5 μm. The light-shielding layer 140 is used to shield the subsequent signal wire 180 formed over the substrate 110. Referring to FIG. 1, since the color layer 130' is partially transparent, the subsequent signal wire 180 would be problematically visible in the absence of the light-shielding layer 140'. Therefore, the touch panel 100 with the light-shielding layer 140' can achieve a better shielding effect.

Figure 4A:
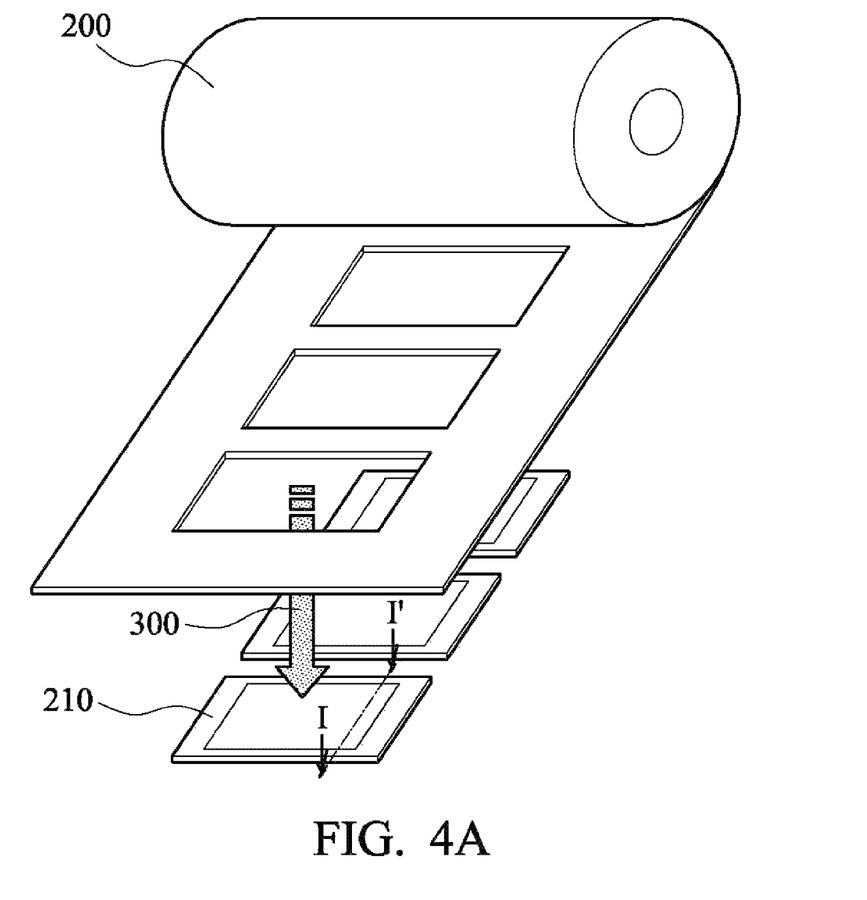
FIG. 4A is a schematic view of a cutting step in accordance with some embodiments of the present disclosure.
Figure 4B:
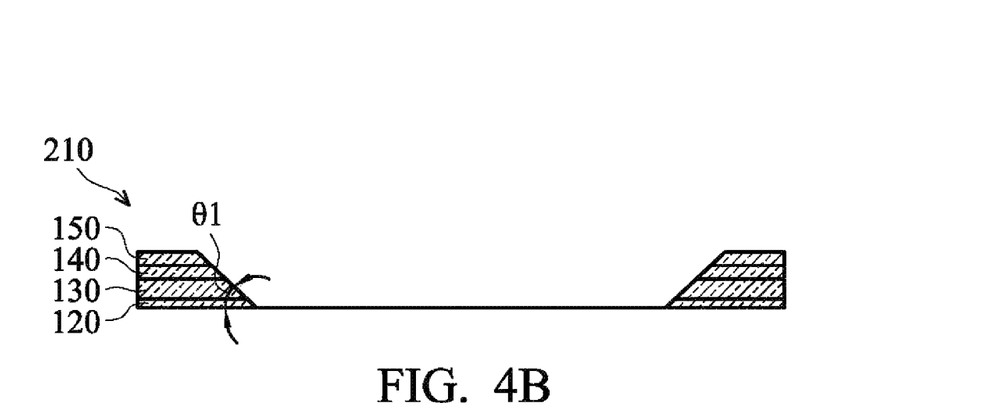
FIG. 4B is a cross-sectional view of a cut stack structure along line I-I' in FIG. 4A in accordance with some embodiments of the present disclosure.

Next, as shown in step S130 of FIG. 11, the stack structure 200 is cut into a predetermined shape by the cutting step 300. The cut shape of the stack structure 210 corresponds to a shape of the non-visible region 110B. FIG. 4A is a schematic view of a cutting step in accordance with some embodiments of the present disclosure. In some embodiments, as shown in FIG. 4A, the cutting step 300 used to cut the stack structure 200 is die-cutting. Besides, FIG. 4B is a cross-sectional view of the cut stack structure 200 along line I-I' in FIG. 4A in accordance with some embodiments of the present disclosure. As shown in FIG. 4B, the acute angle between at least one side of the cut stack structure 210 and the surface of the bottom protective layer 120 of the stack structure 210 is defined as the first angle θ1. The first angle θ1 is about 60 degrees to about 85 degrees, and the preferred range of the first angle θ1 is from about 70 degrees to about 80 degrees. The first angle θ1 is a structural feature formed in the aforementioned cutting step by suitable cutting tools.

Figure 5A:
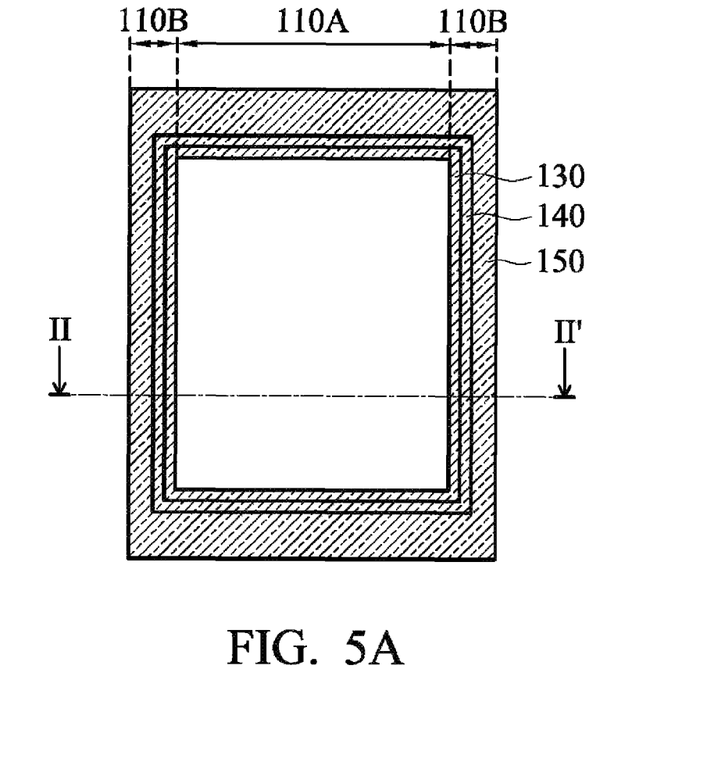
FIG. 5A is a top view of a substrate with a stack structure laminating on the non-visible region of the substrate after removing the bottom protective layer in accordance with some embodiments of the present disclosure.
Figure 5B:
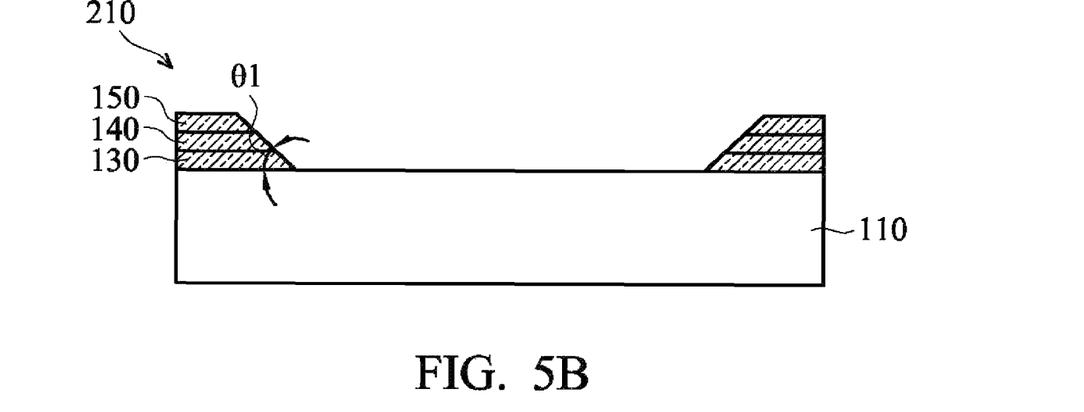
FIG. 5B is a cross-sectional view along line II-II' in FIG. 5A in accordance with some embodiments of the present disclosure.

Next, referring to FIGS. 5A-5B and step S140 of FIG. 11, the bottom protective layer 120 of the cut stack structure 210 is removed, and then the cut stack structure 210 is laminated onto the non-visible region 110B of the substrate 110, wherein the color layer 130 faces toward the substrate 110. This lamination step is an one-time lamination step, the stack structure 210 without the bottom protective layer 120 is directly laminated onto the substrate 110. FIG. 5A is a top view of the substrate 110 with a stack structure 210 laminating on the non-visible region 110B of the substrate 110 after removing the bottom protective layer 120 in accordance with some embodiments of the present disclosure. As shown in FIG. 5A, the inner side of the stack structure 210 adjacent to the visible region 110A is not arranged in a vertically aligned manner. Instead, the inner side of the stack structure 210 adjacent to the visible region 110A has a slope with the first angle θ1. Therefore, in the top view shown in FIG. 5A, the exposed portions from the peripheral region (the non-visible region 110B) to the central region (the visible region 110A) are sequentially the top protective layer 150, the light-shielding layer 140, and the color layer 130. FIG. 5B is a cross-sectional view along line II-II' in FIG. 5A in accordance with some embodiments of the present disclosure. As shown in FIG. 5B, the acute angle between the stack structure 210 without the bottom protective layer 120 and the surface of the substrate 110 is also the first angle θ1. Since the stack structure 210 has an inclined sidewall, the slope of the joint surface of the subsequent sensing layer 170 and the light-shielding layer 140 and the color layer 130 of the stack structure 210 can be reduced, which further ameliorates the broken-wire problem of the subsequent sensing layer 170.

The present disclosure utilizes a cutting step 300 and a one-time laminating step to replace the conventional segmental printing which needs multiple manufacturing steps, which further reduces the complexity of manufacture and lower the cost. In the meantime, the present disclosure can increase the yield and the throughput due to the reduction of the manufacturing steps needed.

Figure 6A:
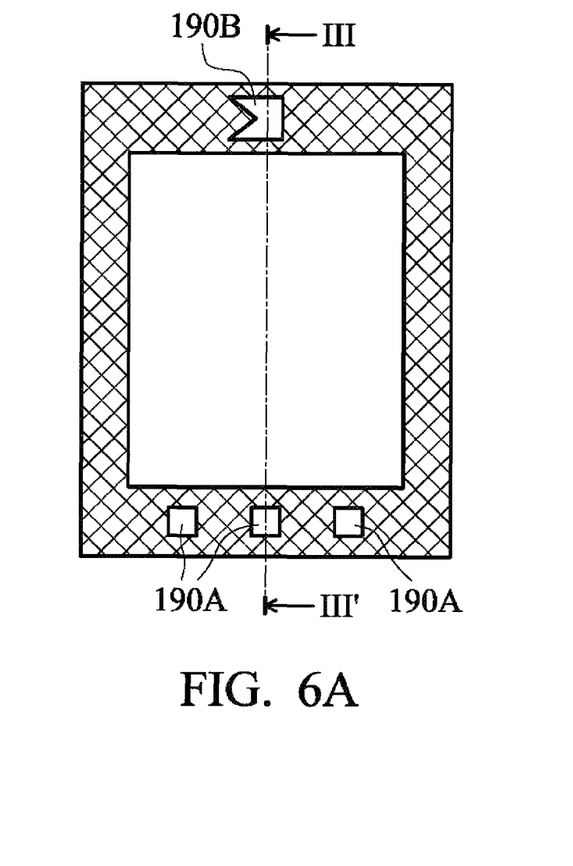
FIG. 6A is a top view of a substrate with remarks in accordance with some embodiments of the present disclosure.
Figure 6B:
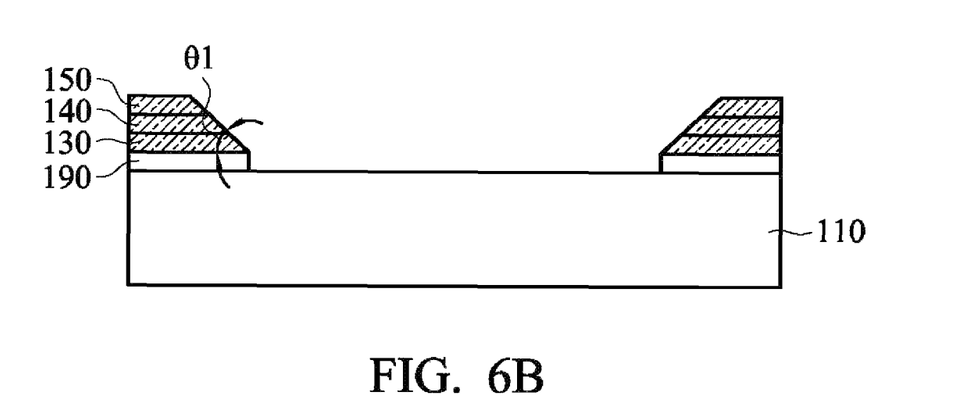
FIG. 6B is a cross-sectional view along line III-III' in FIG. 6A in accordance with some embodiments of the present disclosure.

In some embodiments of the present disclosure, a mark 190 can be formed over the non-visible region 110B of the substrate 110 before the laminating step. Then the stack structure 210 without the bottom protective layer 120 is laminated onto the non-visible region 110B of the substrate 110. In some embodiments of the present disclosure, as shown in FIG. 6A, which is a top view of a substrate with remarks in accordance with some embodiments of the present disclosure, the mark 190 can be a regular-shaped mark 190A disposed below the non-visible region 110B or any other suitable positions. The regular-shaped mark 190A can be a rectangular mark or a circular mark. However, the mark 190 can also be an irregular-shaped mark 190B disposed above the non-visible region 110B or any other suitable positions, as shown in FIG. 6A. The irregular-shaped mark 190B can be a word, functional buttons or any other suitable irregular figures. FIG. 6B is a cross-sectional view along line III-III' in FIG. 6A in accordance with some embodiments of the present disclosure. As shown in FIG. 6B, the mark 190 is disposed between the non-visible region 110B of the substrate 110 and the color layer 130.

Figure 7:
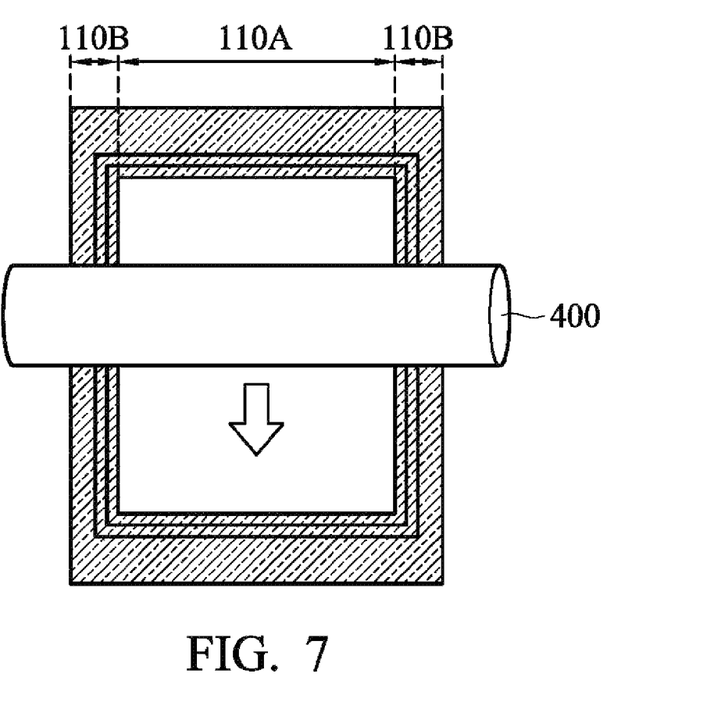
FIG. 7 is a schematic view of a pressing step in accordance with some embodiments of the present disclosure.

In some embodiments of the present disclosure, the stack structure 210 on the substrate 110 can be pressed by a roller 400 after the laminating step, as shown in FIG. 7. This pressing step can firmly adhere the stack structure 210 without the bottom protective layer 120 to the substrate 110, and further increase the yield and the throughput of this laminating step.

Figure 8:
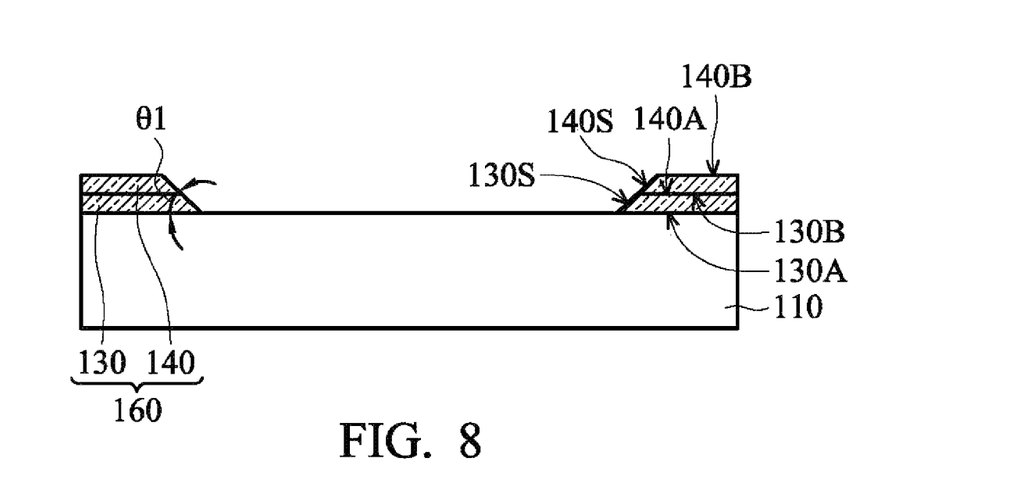
FIG. 8 is a cross-sectional view of a composite layer and a substrate in accordance with some embodiments of the present disclosure.

Next, as shown in FIG. 8 and step S150 of FIG. 11, the top protective layer 150 is removed, and the color layer 130 and the light-shielding layer 140 remain to form a composite layer 160 over the substrate 110. The composite layer 160 is disposed over the non-visible region 110B of the substrate 110. The color layer 130 has a first surface 130A and a second surface 130B, wherein the first surface 130A and the second surface 130B are opposite to each other and the first surface 130A faces toward the substrate 110. The light-shielding layer 140 has a third surface 140A and a fourth surface 140B, wherein the third surface 140A and the fourth surface 140B are opposite to each other and the third surface 140A faces toward the second surface 130B of the color layer 130. The first surface 130A has a greater area than the second surface 130B. The second surface 130B has the same area with the third surface 140A. The second surface 130B has a greater area than the fourth surface 140B.

Still referring to FIG. 8, the side of the color layer 130 adjacent to the visible region 110A has a first inclined surface 130S, and the side of the light-shielding layer 140 adjacent to the visible region 110A has a second inclined surface 140S. The first inclined surface 130S and the second inclined surface 140S are formed a continuous surface. In some embodiments of the present disclosure, the slope of the first inclined surface 130S is the same as the second inclined surface 140S. In this step, the acute angle between one side of the cut stack structure and laminating processes and the surface of the substrate 110 is the first angle θ1. In particular, the acute angle between the color layer 130 and the surface of the substrate 110 is the first angle θ1. The first inclined surface 130S of the color layer 130 and the second inclined surface 140S of the light-shielding layer 140 can be a joint surface.

Figure 9:
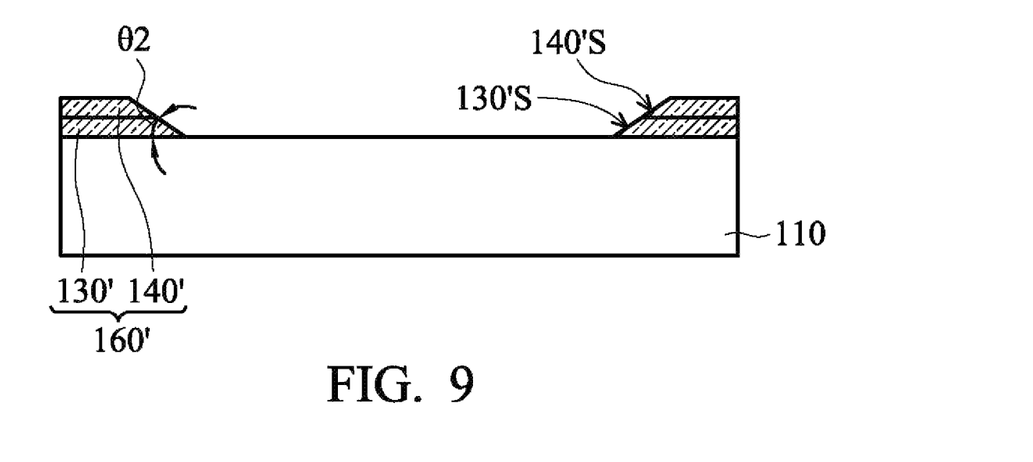
FIG. 9 is a cross-sectional view of a composite layer and a substrate after baking in accordance with some embodiments of the present disclosure.
Figure 10A:
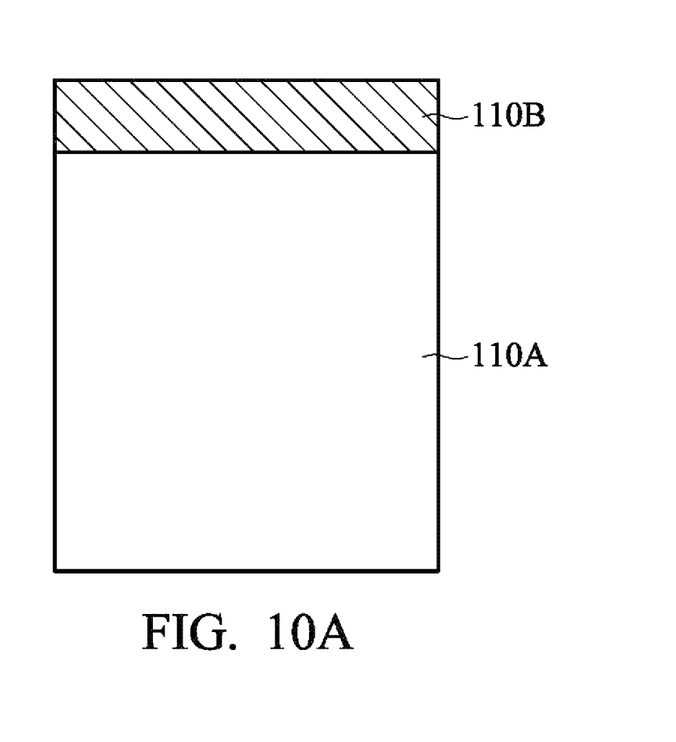
FIGS. 10(a)-10(d) are top views of a substrate in accordance with another embodiment of the present disclosure.
Figure 10B:
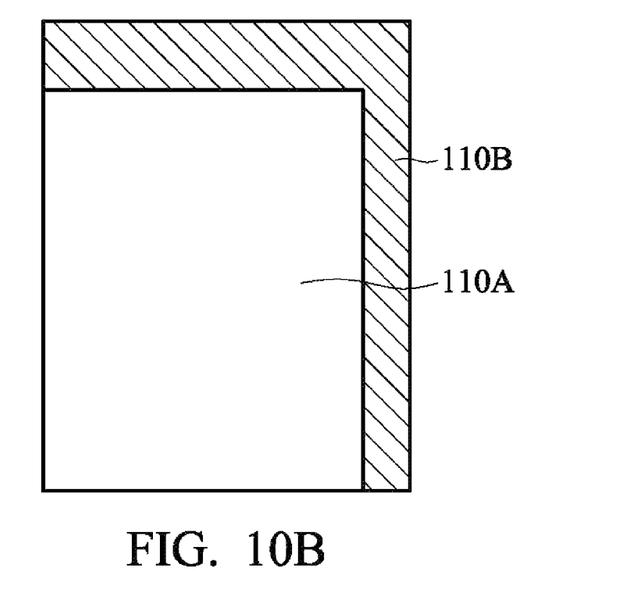
Figure 10C:
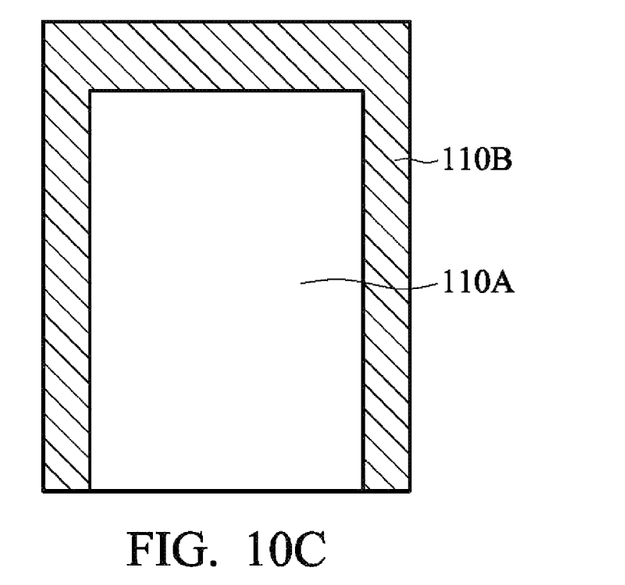
Figure 10D:
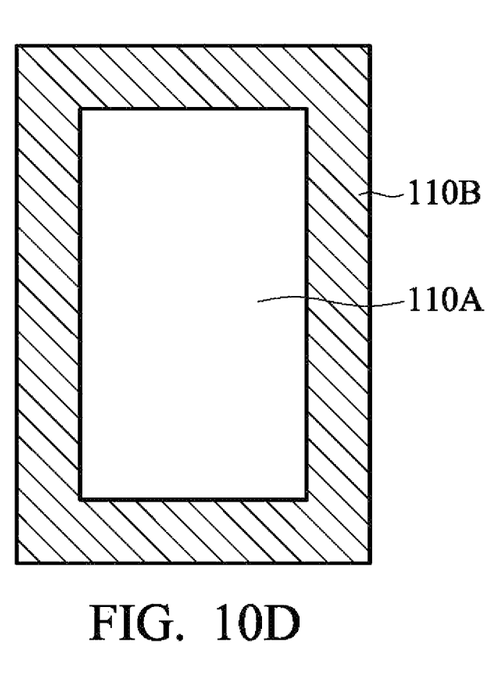

Next, as shown in step S160 of FIG. 11, a baking process is performed to deform the composite layer 160. The baking temperature is about 200° C. to about 300° C., preferably about 230° C. to about 260° C. FIG. 9 is a cross-sectional view of the substrate 110 and the composite layer 160' after baking in accordance with some embodiments of the present disclosure. The baked composite layer 160' includes the baked color layer 130' and the baked light-shielding layer 140'. The side of the baked color layer 130' adjacent to the visible region 110A has a baked first inclined surface 130'S, and the side of the baked light-shielding layer 140' adjacent to the visible region 110A has a baked second inclined surface 140'S. The first inclined surface 130'S and the second inclined surface 140'S are formed a continuous surface. In some embodiments of the present disclosure, the slope of the first inclined surface 130'S is the same as that of the second inclined surface 140'S.

Still referring to FIG. 9, the deformation of the composite layer 160' produced in the baking process makes the acute angle between the baked composite layer 160' and a main surface of the substrate 110 a second angle θ2. The second angle θ2 is about 30 degrees to about 60 degrees, preferably about 40 degrees to about 50 degrees. The second angle θ2 is smaller than the first angle θ1. Since the second angle θ2 is smaller than the first angle θ1, this baking process can further reduce the slope of the joint surface of the subsequent sensing layer 170 and the light-shielding layer 140' and the color layer 130' of the stack structure 210, such that the sensing layer 170 is less prone to fracture at the sidewall.

Next, as shown in step S170 of FIG. 11, a sensing layer 170 and a signal wire 180 are formed to complete the touch panel 100 as shown in FIG. 1. The sensing layer 170 is disposed over the visible region 110A and extending to a portion of the non-visible region 110B. The sensing layer 170 directly contacts the visible region of the substrate 110A. The sensing layer 170 includes a sensing electrode made of transparent conductive material. The transparent conductive material can be nano-silver, indium tin oxide (ITO), indium zinc oxide (IZO), aluminum zinc oxide (AZO) or any other suitable transparent conductive materials. The sensing electrode of the sensing layer 170 can be formed by printing or deposition processes accompanied with patterning processes.

The signal wire 180 is disposed over the composite layer 160' and is located in the non-visible region 110B. The signal wire 180 includes a conductive wire made of metal. The signal wire 180 electrically connects the sensing layer 170 to transmit the electric variance of the sensing layer 170 to the external circuit.

It should be noted that the sensing layer 170 and the signal wire 180 illustrated in FIG. 1 is merely an exemplary structure, those skilled in the art will appreciate that other configurations of the sensing layer and the signal wire used in touch panels are also applicable.

Besides, although all the non-visible region 110B in each embodiments aforementioned are disposed at four sides of the substrate 110, the non-visible region 110B can be disposed at one side, two sides, three sides or four sides of the substrate 110, as shown in FIGS. 10(a)-10(d).

In summary, the present disclosure utilizes a cutting step and a one-time laminating step to replace the conventional segmental printing which needs multiple manufacturing steps, which further reduces the complexity of manufacture and lower the cost. In the meantime, the present disclosure can increase the yield and the throughput by reducing the manufacturing steps. Besides, the present disclosure utilizes a baking process to deform the composite layer, which alters the acute angle between the side of composite layer adjacent to the visible region and the main surface of the substrate from the greater first angle to the smaller second angle, and further reduces the slope of the joint surface of the subsequent sensing layer, the light-shielding layer and the color layer such that the sensing layer has a more robust structure and would not be broken easily at the sidewall.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein can be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein can be utilized according to the present disclosure. Accordingly, the appended claims are intended to include within their scope such processes, machines, manufacture, compositions of matter, means, methods, or steps.

What is claimed is:

1. A touch panel, comprising:
   a substrate having a visible region and a non-visible region adjacent to at least one side of the visible region;
   a composite layer disposed over the non-visible region of the substrate, wherein:
     the composite layer comprises a color layer and a light-shielding layer,
     the color layer is disposed between the substrate and the light-shielding layer,
     a side of the color layer adjacent to the visible region of the substrate has a first inclined surface,
     a side of the light-shielding layer adjacent to the visible region of the substrate has a second inclined surface, and
     the first inclined surface and the second inclined surface form a continuous surface;
   a sensing layer disposed over the visible region of the substrate and extending to a portion of the non-visible region of the substrate, wherein the sensing layer directly contacts the visible region of the substrate; and
   a signal wire directly contacting the composite layer.

2. The touch panel as claimed in claim 1, wherein the substrate comprises a transparent tempered glass substrate or a plastic substrate.

3. The touch panel as claimed in claim 1, wherein a thickness of the color layer is 2 μm to 40 μm.

4. The touch panel as claimed in claim 1, wherein the color of the color layer is black, white, or colored.

5. The touch panel as claimed in claim 1, wherein a thickness of the light-shielding layer is 1 μm to 5 μm.

6. The touch panel as claimed in claim 1, wherein the color of the light-shielding layer is black and the light-shielding layer masks the signal wire.

7. The touch panel as claimed in claim 1, wherein the first inclined surface has a first slope and the second inclined surface has a second slope the same as the first slope.

8. The touch panel as claimed in claim 1, wherein:
   the color layer has a first surface and a second surface,
   the first surface and the second surface are opposite to each other,
   the first surface faces toward the substrate,
   the light-shielding layer has a third surface and a fourth surface,
   the third surface and the fourth surface are opposite to each other,
   the third surface faces toward the second surface of the color layer,
   an area of the first surface is greater than an area of the second surface,
   the area of the second surface is the same as an area of the third surface, and
   the area of the second surface is greater than an area of the fourth surface.

9. The touch panel as claimed in claim 1, wherein the sensing layer comprises a sensing electrode made of transparent conductive material.

10. The touch panel as claimed in claim 1, wherein the signal wire comprises a conductive wire made of metal.

11. The touch panel as claimed in claim 1, wherein the signal wire is in direct contact with the light-shielding layer of the composite layer.

12. The touch panel as claimed in claim 1, further comprising a mark disposed between the non-visible region of the substrate and the color layer.

13. The touch panel as claimed in claim 1, wherein an acute angle between the continuous surface and the substrate is from 70 degrees to 80 degrees.

14. The touch panel as claimed in claim 1, wherein the sensing layer further directly contacts the first inclined surface and the second inclined surface.

15. The touch panel as claimed in claim 14, wherein the sensing layer further directly contacts a top surface of the light-shielding layer.

* * * * *